US005525237A

United States Patent [19]

Birbara et al.

[11] Patent Number: 5,525,237
[45] Date of Patent: *Jun. 11, 1996

[54] PROCESS FOR REMOVING FREE AND DISSOLVED $CO_2$ FROM AQUEOUS SOLUTIONS

[75] Inventors: Philip J. Birbara, Windsor Locks; Timothy A. Nalette, Tolland, both of Conn.

[73] Assignee: United Technologies Corporation, Hartford, Conn.

[*] Notice: The term of this patent shall not extend beyond the expiration date of Pat. No. 5,518,626.

[21] Appl. No.: 173,570

[22] Filed: Dec. 23, 1993

[51] Int. Cl.$^6$ ................................. C02F 1/28; C02F 1/42
[52] U.S. Cl. .......................................... 210/670; 210/683
[58] Field of Search .................................. 210/664, 668, 210/670, 673, 764, 269, 274, 683

[56] References Cited

U.S. PATENT DOCUMENTS

| | | | |
|---|---|---|---|
| 2,414,026 | 1/1947 | Cox et al. | 23/139 |
| 3,346,484 | 10/1967 | Lewis | 208/237 |
| 3,651,616 | 3/1972 | Blanchard et al. | 55/16 |
| 3,992,293 | 11/1976 | Sawicki et al. | 210/48 |
| 4,029,574 | 6/1977 | Reimann | 210/3 |
| 4,039,442 | 8/1977 | Kadlec et al. | 210/673 |
| 4,059,492 | 11/1977 | Hausweiler et al. | 203/11 |
| 4,160,725 | 7/1979 | Josis et al. | 210/21 |
| 4,202,737 | 5/1980 | Shimizu | 210/664 |
| 4,210,613 | 7/1980 | Webb | 261/120 |
| 4,265,642 | 5/1981 | Mir et al. | 55/85 |
| 4,297,220 | 10/1981 | Meitzner et al. | 210/690 |
| 4,342,730 | 8/1982 | Perrotta | 423/215.5 |
| 4,378,235 | 3/1983 | Cosper et al. | 55/85 |
| 4,397,743 | 8/1983 | Green et al. | 210/735 |
| 4,410,503 | 10/1983 | Van Nassua et al. | 423/359 |
| 4,456,535 | 6/1984 | Zuidam et al. | 210/750 |
| 4,517,094 | 5/1985 | Beall | 210/664 |
| 4,518,503 | 5/1985 | Fermaglich | 210/662 |
| 4,526,692 | 7/1985 | Yohe et al. | 210/747 |
| 4,544,488 | 10/1985 | O'Brien | 210/664 |
| 4,547,293 | 10/1985 | King et al. | 210/638 |
| 4,582,610 | 4/1986 | Baker | 210/747 |
| 4,597,833 | 7/1986 | Neel et al. | 203/49 |
| 4,608,163 | 8/1986 | Yohe et al. | 210/150 |
| 4,746,438 | 5/1988 | Riggs, Jr. | 210/664 |
| 4,808,287 | 2/1989 | Hark | 204/182.5 |
| 4,842,748 | 6/1989 | Agnihotri et al. | 210/774 |
| 4,844,805 | 7/1989 | Solomon | 210/321.82 |
| 4,846,934 | 7/1989 | Carberry | 202/177 |
| 4,857,198 | 8/1989 | Meidl | 210/603 |
| 4,871,450 | 10/1989 | Goodrich et al. | 210/151 |
| 4,879,041 | 11/1989 | Kurokawa et al. | 210/640 |
| 4,890,673 | 1/1990 | Payne | 166/266 |
| 4,902,422 | 2/1990 | Pinnau et al. | 210/500.23 |
| 4,945,988 | 8/1990 | Payne et al. | 166/266 |
| 4,950,394 | 8/1990 | Bernhardt et al. | 210/170 |
| 4,954,258 | 9/1990 | Little | 210/611 |
| 4,960,520 | 10/1990 | Semmens | 210/640 |
| 4,966,096 | 10/1990 | Adey | 119/3 |
| 4,980,101 | 12/1990 | Beck et al. | 264/41 |
| 4,997,571 | 3/1991 | Roensch et al. | 210/698 |
| 5,004,484 | 4/1991 | Stirling et al. | 55/53 |

(List continued on next page.)

FOREIGN PATENT DOCUMENTS

| | | |
|---|---|---|
| 0167957 | 1/1986 | European Pat. Off. . |
| 2738120 | 3/1979 | Germany . |
| 61-042395 | 2/1986 | Japan . |

Primary Examiner—Ivars Cintins
Attorney, Agent, or Firm—Mary R. Bonzagni; Holland & Bonzagni

[57] ABSTRACT

The present invention provides a process and a system for removing inorganic carbon in the form of free and dissolved $CO_2$ from aqueous solutions. The process and the system contemplate the use of a thermally regenerable and optionally thermally sterilizable ion exchange resin for adsorption of inorganic carbon. As a result, the need for regeneration of the resin by chemical means is obviated and expendable resin quantities are reduced. Therefore, the present invention will be especially useful in spacecraft and planet based applications where the need exists for reduced weight and volume water processing systems.

5 Claims, 2 Drawing Sheets

U.S. PATENT DOCUMENTS

| | | | |
|---|---|---|---|
| 5,013,339 | 5/1991 | Mahoney et al. | 55/158 |
| 5,015,275 | 5/1991 | Beck et al. | 55/158 |
| 5,018,576 | 5/1991 | Udell et al. | 166/272 |
| 5,022,996 | 6/1991 | McCaffrey et al. | 210/654 |
| 5,030,356 | 7/1991 | Blume et al. | 210/640 |
| 5,045,214 | 9/1991 | Walker | 210/717 |
| 5,067,852 | 11/1991 | Plunkett | 405/128 |
| 5,069,796 | 12/1991 | Fox | 210/664 |
| 5,097,795 | 3/1992 | Adey | 119/3 |
| 5,106,507 | 4/1992 | Von Klock et al. | 210/664 |
| 5,116,515 | 5/1992 | Selesnick | 210/744 |
| 5,122,166 | 6/1992 | Hyrcyk et al. | 55/38 |
| 5,151,194 | 9/1992 | Simpson et al. | 210/680 |
| 5,190,665 | 3/1993 | Titmas et al. | 210/743 |
| 5,236,590 | 8/1993 | Sciamanna et al. | 210/639 |
| 5,244,478 | 9/1993 | Jolly | 95/46 |

5,525,237

PROCESS FOR REMOVING FREE AND DISSOLVED CO₂ FROM AQUEOUS SOLUTIONS

FIELD OF THE INVENTION

This invention relates to the removal of inorganic carbon in the form of free and dissolved carbon dioxide ($CO_2$) from aqueous solutions and has spacecraft and planet based applications.

BACKGROUND OF THE INVENTION

A first step in the reduction of the total organic carbon (TOC) present in an aqueous stream may be any one of a number of oxidation processes, including biological, catalytic and ultraviolet-persulfate oxidation processes. The carbon components of the dissolved organics contributing to the TOC, as a result of such processes, are completely oxidized to inorganic carbon (as free $CO_2$ and as dissolved $CO_2$ such as carbonate ions ($CO_3^{-2}$) and bicarbonate ions ($HCO_3^-$)). Removal of the free and dissolved $CO_2$ may be achieved by a number of techniques, including mechanical means and various processes that typically utilize expendable and/or chemically regenerated anion exchange resins.

Mechanical means which include devices with membrane configurations, gaseous sparging and ultrasonic degassing are successful in reducing dissolved $CO_2$ concentrations to levels approaching concentrations predicted by Henry's Law. However, these devices are typically hampered by slow rates in reaching the predicted equilibrium concentrations. In addition, further processing is required to remove residual "equilibrium" concentrations.

Expendable and/or chemically regenerated resin dependent processes, while capable of removing free and dissolved $CO_2$ from solution, result in high resupply weight and volume penalties in spacecraft and/or planet based applications. These resin dependant processes typically utilize either cationic or anionic resins that are, in practice, regenerated by chemical means (i.e., acid washing for cationic resins and alkaline washing for anionic resins). Of these resins, strong base anion resins are capable of removing bicarbonate ions, but are not stable at elevated temperatures ($\geq 60°$ C.) and are not fully amenable to thermal regeneration due to the strong chemical bonding of $CO_2$ with the resin. A few weak base anion resins are stable at temperatures approaching 121° C., but do not demonstrate a high capacity for anions.

It is therefore an object of the present invention to provide a thermally regenerable and optionally thermally sterilizable ion exchange resin that serves to obviate the need for regeneration of the resin by chemical means and that serves to reduce expendable resin quantities needed for removing from aqueous solutions free and dissolved $CO_2$ resulting from total organic carbon oxidation processes.

It is a further object of the present invention to provide a thermally regenerable and sterilizable ion exchange resin that enables the control and maintenance of a microbial free resin environment.

It is still a further object of the present invention to provide a process for removing free and dissolved $CO_2$ from aqueous solutions that utilizes a thermally regenerable and optionally thermally sterilizable ion exchange resin.

It is yet a further object to provide a system for removal of free and dissolved $CO_2$ from aqueous solutions that utilizes such a thermally regenerable and optionally thermally sterilizable ion exchange resin.

SUMMARY OF THE INVENTION

The present invention therefore provides a process for removing inorganic carbon in the form of free and dissolved $CO_2$ from an aqueous solution, which comprises the steps of: (a) passing the solution through an ion exchange resin bed for adsorption of the inorganic carbon from the solution, where the resin bed comprises a thermally regenerable and optionally thermally sterilizable resin; (b) thermally regenerating the resin for desorption of the inorganic carbon; and (c) optionally repeating steps (a) and (b) at least once. The inventive process can further comprise the step of thermally sterilizing the resin so as to destroy all forms of microbial life on or in the resin.

The present invention further provides a system for removal of inorganic carbon from an aqueous solution which comprises: (a) a flow through ion exchange resin bed through which the aqueous solution is passed, where the resin bed comprises a thermally regenerable and optionally thermally sterilizable resin for adsorbing the inorganic carbon from the solution; and (b) means for thermally regenerating the resin for desorption of the inorganic carbon. The inventive system can further comprise means for thermally sterilizing the resin.

DESCRIPTION OF THE PREFERRED EMBODIMENT

The ion exchange resin of the present invention can be any thermally regenerable and optionally thermally sterilizable anion exchange resin capable of removing inorganic carbon (as $CO_2$, $HCO_3^-$ and $CO_3^{-2}$) from aqueous solutions. In particular, such resins must remain stable for prolonged periods at temperatures approaching 82° C. and preferably at temperatures around 121° C. and must have a high capacity for anions. Anion exchange resins that remain stable at temperatures approaching 82° C. are regenerable resins. At such elevated temperatures, it is theorized that the equilibrium $CO_2$ capacity of the resin, as contemplated by the present invention, is significantly reduced causing the release of gaseous $CO_2$ and $CO_2$ ionic species. This release results in the restoration of the resin's $CO_2$ capacity at lower temperatures, thus regenerating the resin. Anion exchange resins that remain stable at temperatures around 121° C. are sterilizable resins. These resins are capable of withstanding high temperatures for sufficient time periods necessary to destroy all forms of microbial life on or within the resin and, as such, embody a feature that is extremely important in any water treatment process. For purposes of the present invention, the term "a high capacity for anions" is intended to mean a volumetric total ion exchange capacity of at least 1.0 milliequivalent (meq)/milliliter (ml), as measured by standard wet chemistry titration methods and a weight total ion exchange capacity of at least 4.0 meq/gram (g) of dry resin.

Preferred resins are made by copolymerizing styrene with divinylbenzene and/or vinylethylbenzene and contain amine functionality. In addition, these preferred resins have porous structures which are able to efficiently adsorb and desorb large organic ions. Included among these preferred resins are anion exchange resins available from Mitsubishi Kasei America, Inc., White Plains, N.Y. and sold under the trademarks DIAION WA20 and DIAION WA21. DIAION WA20 and DIAION WA21 are porous and high porous type weak base anion exchange resins in the OH ionic form based on the copolymer of styrene and divinylbenzene, respectively. The volumetric total ion exchange capacity of these resins is about 2.5 meq/ml (WA20) and about 2.0 meq/ml (WA21). The structure of the DIAION WA20 and WA21 resins is as follows:

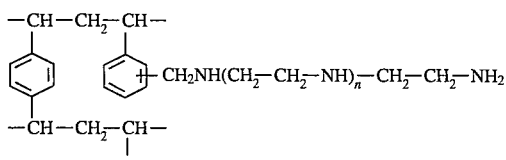

where n=1 to 3.

The most preferred anion exchange resin is DIAION WA21, a high porous type weak base anion exchange resin available from Mitsubishi Kasei.

The preferred process and system described herein are not intended to be exhaustive or to limit the invention to the precise form or steps disclosed. They are chosen and described to illustrate the principles of the invention so that others skilled in the art may utilize its teachings.

Figure 1:
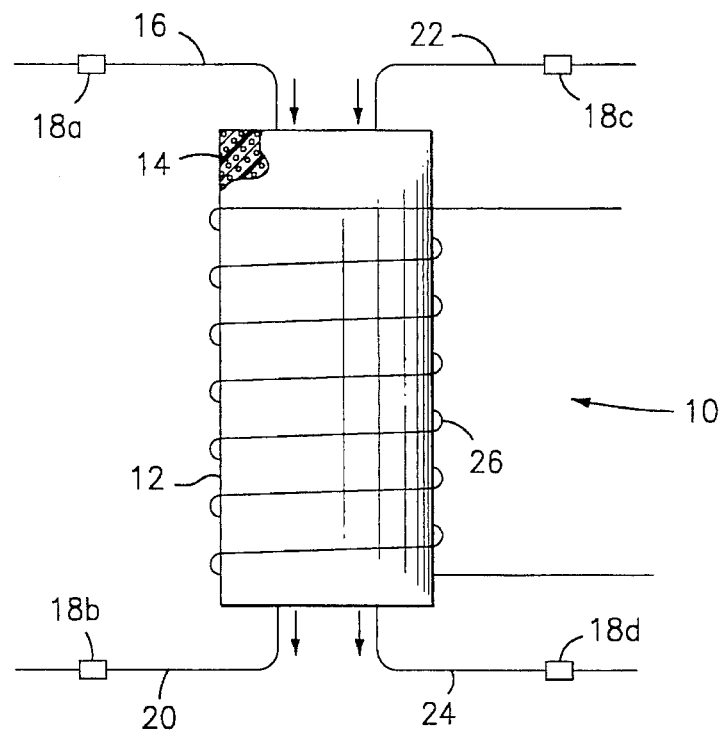
FIG. 1 shows an inorganic carbon removal system which is constructed according to the teachings of the present invention.

Referring to FIG. 1, reference numeral 10 generally designates a simplified system for removing inorganic carbon (as free and dissolved $CO_2$), from an aqueous solution. System 10 generally includes a resin bed 12 which may conveniently take the form of a column that is packed with a thermally regenerable and optionally thermally sterilizable ion exchange resin 14. The column or bed 12 is provided with an inlet 16 having a valve means 18a to receive an influent containing inorganic carbon and with an outlet 20 also having a valve means 18b to receive an effluent free from inorganic carbon from the packed resin bed 12. The column or bed 12 is further provided with a purge gas inlet 22 having a valve means 18c and with an outlet 24 also having a valve means 18d to receive $CO_2$, water containing $CO_2$ ionic species and purge gas. Arrows on the inlet and outlet lines designate the direction of flow. The column or bed 12 is also provided with a means 26 for thermally regenerating the resin 14 which may conveniently take the form of a heater coil wrapped around the full height of the column or bed 12. As is well known in the art packed ion exchange resin beds may be arranged and operated in parallel within any processing system.

Figure 2:
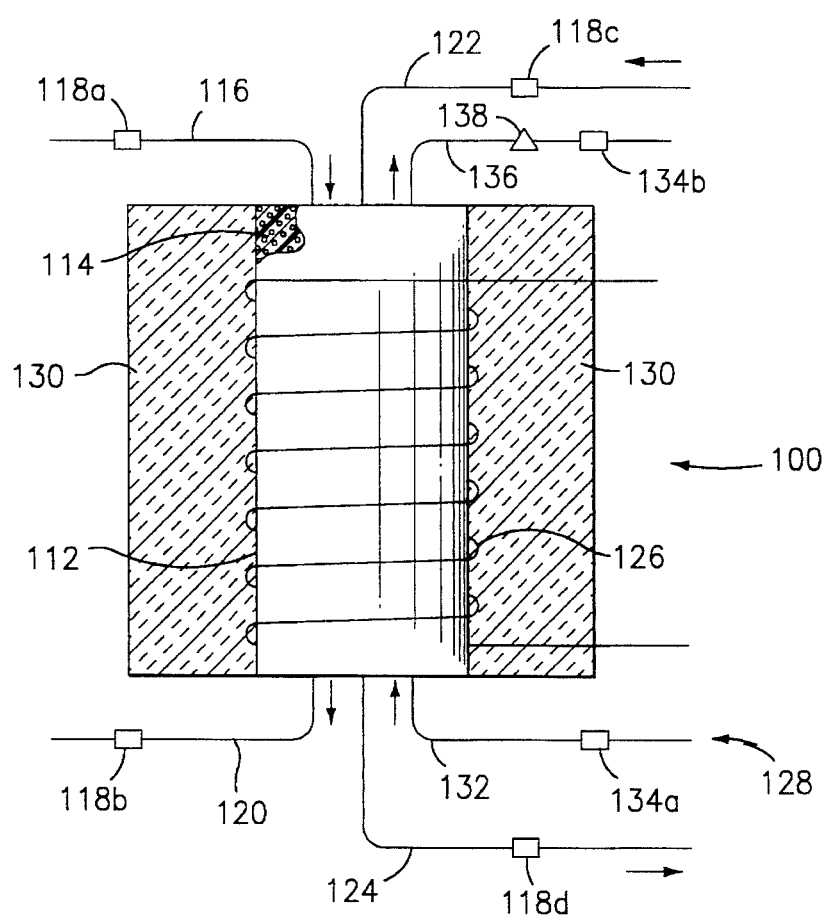
FIG. 2 shows an alternative embodiment of the invention.

Referring to FIG. 2, reference numeral 100 generally designates another embodiment of a simplified system for removing inorganic carbon from an aqueous solution. For ease of reference, common component features of the systems represented by FIG. 1 and FIG. 2 are given reference numbers in FIG. 2 that differ from those set forth in FIG. 1 by a factor of 100. The system shown in FIG. 2, unlike the system shown in FIG. 1, is provided with a means 128 for thermally sterilizing the resin 114 for destroying all forms of microbial life on or in the resin 114. System 100 generally includes a resin bed or column 112 that is packed with a thermally regenerable and thermally sterilizable ion exchange resin 114. The column or bed 112 is wrapped in any suitable insulation material 130 and is provided with an influent inlet 116 having a valve means 118a and with an effluent outlet 120 also having a valve means 118b. The column or bed 112 is further provided with a purge gas inlet 122 having a valve means 118c and with an outlet 124 also having a valve means 118d to receive $CO_2$, water containing $CO_2$ ionic species and purge gas. Also provided is a means 126 for thermally regenerating the resin 114 which may take the form of a heater coil wrapped around the full height of the column or bed 112. The column or bed 112 is further provided with a means 128 for thermally sterilizing the resin 114 which may conveniently take the form of a steam inlet 132 having a valve means 134a and a steam outlet 136 having a valve means 134b and a back pressure regulator 138. Arrows on the inlet and outlet lines designate the direction of flow.

In operation, at least two process cycles are employed—namely, an adsorption cycle and a desorption cycle and optionally a sterilization cycle.

During the adsorption cycle, valve means 18c, 118c; 18d, 118d; 134a and 134b are closed and an aqueous stream containing inorganic carbon, possibly the product of an upstream oxidation process, is introduced through inlet 16, 116 to the resin column or bed 12, 112 containing a thermally regenerable and optionally thermally sterilizable ion exchange resin 14, 114. Within the resin column or bed 12, 112 the aqueous stream intimately contacts the resin 14, 114, enabling the adsorption of $CO_2$ according to equation (1) and the adsorption of bicarbonate ions and/or carbonate ions from the solution according to equations (2) and (3) respectively (for OH ionic form resins):

$$\text{Resin}(OH^-) + CO_2 \rightarrow \text{Resin}(HCO_3^-) \tag{1}$$

$$\text{Resin}(OH^-) + HCO_3^- \rightarrow \text{Resin}(CO_3^{-2}) + H_2O \tag{2}$$

$$\text{Resin}(OH^-) + CO_3^{-2} \rightarrow \text{Resin}(CO_3^{-2}) + OH^- \tag{3}$$

As is well known in the art, influent flow rates and resin bed residence times are determined based upon the concentration of inorganic carbon present in the influent stream and the removal capabilities of the particular resin employed. Water, free from inorganic carbon, exits the resin column or bed 12, 112 through outlet 20, 120. As is also well known in the art monitoring of the effluent streams pH and carbonate ion concentration will enable early detection of the resin's diminished $CO_2$ adsorption capacity and therefore the need to regenerate the resin.

During the desorption or regeneration cycle, valve means 18a, 118a and 18b, 118b are closed trapping a portion of the influent stream in resin column or bed 12, 112. Valve means 18c, 118c and 18d, 118d are then opened and a purge gas (i.e., nitrogen, argon, etc.) is introduced through inlet 22, 122 into the resin column or bed 12, 112. Means 26, 126 for thermally regenerating the resin 14, 114 for desorption of the inorganic carbon are then employed. It is preferred that the aqueous solution surrounding the resin 14, 114 be heated to temperatures from about 71° C. to about 82° C. for 20 to 30 minutes. At these elevated temperatures, the resin's 14, 114 equilibrium capacity for free and dissolved $CO_2$ is significantly reduced such that equations (1), (2) and (3) are reversed. Gaseous $CO_2$ escapes from the solution and $CO_2$ ionic species go back into solution such that the resin's $CO_2$ adsorption capacity, at lower temperatures, is restored. $CO_2$, water containing $CO_2$ ionic species and purge gas exit through outlet 24, 124.

During the optional sterilization cycle, which may follow each desorption or regeneration cycle or which may be performed on an "as needed" basis, means 128 for thermally sterilizing the resin 14, 114 for destroying microbial life are employed. The term sterilization is defined as the total absence of living organisms. It is preferred that the resin 14, 114 be sterilized by either dry-heat or steam sterilization with steam sterilization being the most preferred sterilization technique.

Dry-heat sterilization is generally conducted at from about 160° C. to about 170° C. for greater than or equal to two hours. At considerably higher temperatures, the required exposure times are much shorter. Forced-air type ovens are usually recommended for better temperature distribution.

Steam sterilization is sterilization by moist heat. It cannot be considered adequate without assurance that complete steam penetration takes place to all surfaces of the resin 14, 114 to be sterilized. The critical parameters of steam sterilization are temperature, time, air elimination, steam quality and the absence of superheating.

Steam sterilization at 100° C. and atmospheric pressure is not considered effective. To be effective, steam sterilization should be carried out under higher pressure using saturated steam. Although the temperature can be as low as 115° C., it is preferred that the temperature be 121° C. or higher.

The success of steam sterilization is dependent on direct steam contact which can be prevented by the presence of air in the resin column or bed. Where the ability of steam to heat a surface to a given temperature is considerably reduced by the presence of air, air elimination is regarded as an absolute parameter.

The term steam quality refers to the amount of dry steam present relative to liquid water (in the form of droplets). Excessive amounts of water can result in drying problems following exposure, and greater than 3% water or less than 97% quality steam is considered unacceptable.

Superheated steam results when steam is heated to a temperature higher than that which would produce saturated steam. As a result, the equilibrium between liquid and vapor is destroyed, and the steam behaves as a gas. In particular, it loses its ability to condense into moisture when in contact with the cooler surface of the article (e.g., resin) to be sterilized.

Those skilled in the art will recognize that the selection of an appropriate "steam sterilization cycle" must be made after a careful study of the nature of the resin to be sterilized and the type and number of organisms present.

In a preferred steam sterilization cycle, valve means 18a, 118a; 18b, 118b; 18c, 118c; and 18d, 118d are closed, valve means 134a and 134b are opened and steam at a minimum gage pressure of 15 psi having a steam quality of 100% and heated to a temperature of from about 121° C. to about 135° C. is introduced through steam inlet 132 and then passed through resin column or bed 112 for a period of time sufficient to displace any air present in the resin column or bed 112 with steam. Valve means 134b is then closed and steam is allowed to fill the resin column or bed 112. Valve means 134a is then closed and the steam is maintained within the resin column or bed 112 for from about 10 to about 30 minutes, which represents the time required for complete penetration. This includes the heat-up time as well as exposure time. At the end of the steam sterilization cycle, valve means 134b is opened and the pressure is relieved, by allowing the steam to exit through outlet 136. Back pressure regulator 138 controls the flow rate of the steam exiting resin column or bed 112.

The following example is given to illustrate the ability of the present inventive system and process to repeatedly and effectively remove inorganic carbon from an aqueous stream. It is not intended, however, to limit the generally broad scope of the present invention.

EXAMPLE

1. Inlet Water Feed Preparation 10 liters (l) of distilled water within a Nalgene® container was saturated with $CO_2$ at an ambient temperature of 21° C. The total pressure of the $CO_2$ gaseous phase above the $CO_2$ saturated water was maintained at 1 atmosphere with a 10 cubic centimeter (cc)/minute (min) $CO_2$ purge flow. Ion chromatographic analysis, performed at periodic intervals of between 3 and 30 minutes, on the saturated $CO_2$ solution, indicated that the carbonate ion concentration was relatively constant at 1,135±20 parts per million (ppm).

2. Resin Bed Preparation

A quantity of DIAION WA21 resin beads in the OH ionic form, as received, were thoroughly washed within a buret by flowing about 100 volumes of distilled water, in an upflow manner and at a residence time of approximately 5 minutes, through the buret.

55 cc of the washed resin beads were then placed within a 0.5 inch (in) U-tube and the inlet and outlet of the U-tube secured by glass wool insert plugs to form the resin bed.

3. Adsorption/Desorption or Regeneration Process Cycles

Figure 3:
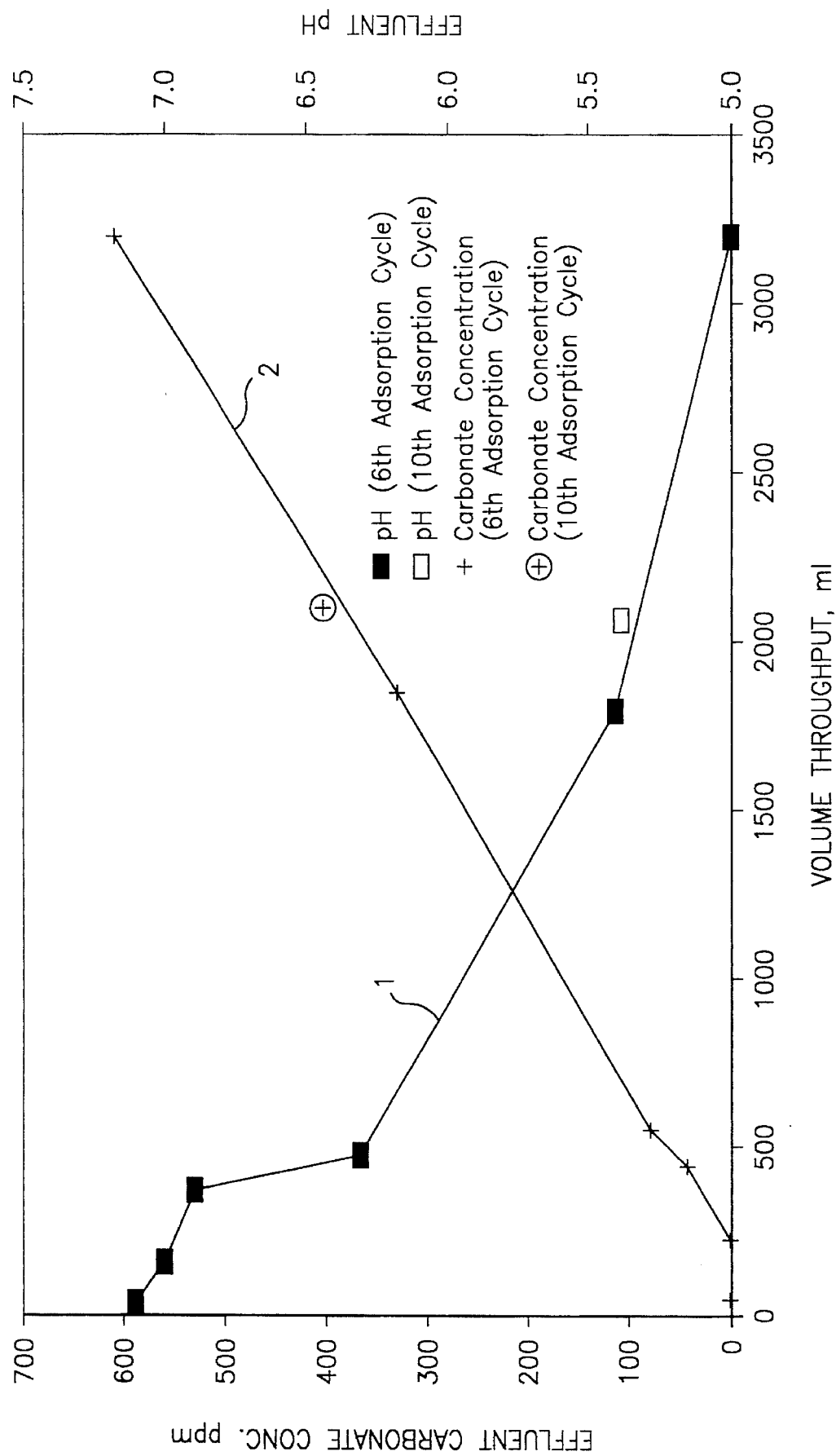
FIG. 3 is a graphical representation of effluent carbonate concentration and effluent pH versus volume throughput of a DIAION WA21 column or resin bed test according to the present invention.

The saturated $CO_2$ water feed solution was pumped into the resin bed by a positive displacement pump at a rate of 30 cc/min for about 110 minutes to constitute the adsorption cycle. After the adsorption cycle, the resin was regenerated. The desorption or regeneration cycle consisted of heating the resin bed in-situ within a hot water bath to a temperature of 77° C. at a rate of about 10° /min. (Visual observation of $CO_2$ bubble release indicated that most of the $CO_2$ was removed at temperatures below 71° C.). The bed was then cooled to complete the regeneration cycle. The adsorption/desorption or regeneration cycles were then repeated ten times. Effluent flow samples were periodically taken for pH and carbonate concentration determinations during each adsorption cycle. A Fisher Scientific Company pH Meter, Accumet™ Model 930 analog, measured pH values and a Dionex series 4500i IC Chromatograph determined carbonate ion concentrations. The data shown in FIG. 3 was obtained during the sixth and tenth adsorption cycles. Referring to FIG. 3, which is meant to be exemplary, not limiting, Line 1 represents the effluent pH per select volume throughput of the saturated $CO_2$ water feed solution for the two adsorption cycles and Line 2 represents the effluent carbonate concentration per select volume throughput for the same two adsorption cycles.

This graphical representation establishes the resins' ability to ensure removal of inorganic carbon when challenged with a 1,135±20 ppm inorganic carbon solution and points to a projected saturation or exhaustion of the subject resin bed at about 3200 ml. inlet water feed. Moreover, the repeatability of these measurements establishes the regenerability of the resin after multiple desorption or regeneration cycles.

Although this invention has been shown and described with respect to the detailed embodiments thereof, it will be understood by those skilled in the art that various changes in form and detail thereof may be made without departing from the spirit and scope of the claimed invention.

Having thus described the invention, what is claimed is:

1. A process for removing inorganic carbon from an aqueous solution comprising:

a. passing said solution through an ion exchange resin bed at least once for adsorption of said inorganic carbon from said solution wherein said resin bed comprises a thermally regenerable anion exchange resin of the formula

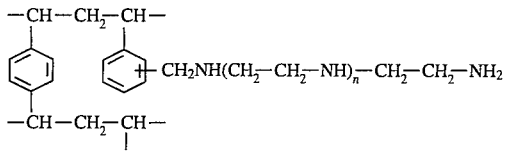

wherein n=1 to 3;

b. thermally regenerating said resin for desorption of said inorganic carbon; and c. optionally repeating steps "a" and "b" at least once.

2. The process of claim 1, wherein said resin is also a thermally sterilizable resin and wherein said process further comprises the step of thermally sterilizing said resin for destroying all forms of microbial life on or in said resin.

3. The process of claim 2, wherein said resin is thermally sterilized with steam at a temperature of at least about 121° C. having a steam quality of at least 97%, in the absence of air, for about 15 to about 25 minutes.

4. The process of claim 1, wherein said resin has a volumetric total ion exchange capacity of at least about 1.0 meq/ml.

5. The process of claim 1, wherein said resin is thermally regenerated at a temperature of from about 71° C. to about 82° C. for about 20 to about 30 minutes.

* * * * *